(12) United States Patent
Mistry

(10) Patent No.: US 8,874,262 B2
(45) Date of Patent: Oct. 28, 2014

(54) OPERATIONAL SPACE CONTROL OF RIGID-BODY DYNAMICAL SYSTEMS INCLUDING HUMANOID ROBOTS

(75) Inventor: Michael N. Mistry, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 376 days.

(21) Appl. No.: 13/246,079

(22) Filed: Sep. 27, 2011

(65) Prior Publication Data

US 2013/0079930 A1    Mar. 28, 2013

(51) Int. Cl.
*G05B 19/00*    (2006.01)

(52) U.S. Cl.
CPC .............. *G05B 19/00* (2013.01); *Y10S 901/15* (2013.01)
USPC .............. 700/245; 700/261; 901/15; 294/106

(58) Field of Classification Search
USPC .................................... 700/245, 261; 901/15
See application file for complete search history.

(56) References Cited

U.S. PATENT DOCUMENTS

| | | | |
|---|---|---|---|
| 7,190,141 B1 * | 3/2007 | Ashrafiuon et al. ..... | 318/568.12 |
| 8,145,354 B2 * | 3/2012 | Goswami et al. ............ | 700/250 |
| 8,332,068 B2 * | 12/2012 | Goswami et al. ............ | 700/245 |
| 8,565,918 B2 * | 10/2013 | Abdallah et al. ............ | 700/245 |
| 2010/0161120 A1 * | 6/2010 | Goswami et al. ............ | 700/245 |
| 2010/0280662 A1 * | 11/2010 | Abdallah et al. ............ | 700/261 |
| 2011/0029130 A1 * | 2/2011 | Goswami et al. ............ | 700/250 |
| 2012/0143374 A1 * | 6/2012 | Mistry et al. ............ | 700/259 |
| 2013/0079930 A1 * | 3/2013 | Mistry ............ | 700/261 |

OTHER PUBLICATIONS

Mistry, Michael, et al., "Operational Space Control of Constrained and Underactuated Systems," Proceedings of Robotics: Science and Systems, Jun. 2011, Los Angeles, CA.
Nemec, Bojan, et al., "Stability of Null-Space control Algorithms," Proceedings of RAAD'03, 12th international Workshop on Robotics in Alpe-Adria-Danube Region Cassino, May 7-10, 2003.
Nagarajan, Umashankar, et al., "Dynamic Constraint-based Optimal Shape Trajectory Planner for Shape-Accelerated Underactuated Balancing Systems," 2010 Robotics: Science and Systems, Jun. 27-31, 2010, Zaragoza, Spain.
Shkolnik, Alexander, et al., "High-Dimensional Underactuated Motion Planning via Task Space Control," 2008 IEEERSJ International conference on Intelligent Robots and Systems (2008) ISBN: 9781424420575.

(Continued)

*Primary Examiner* — Thomas G Black
*Assistant Examiner* — Wae Louie
(74) *Attorney, Agent, or Firm* — Marsh Fischmann & Breyfogle LLP; Kent A. Lembke

(57) ABSTRACT

An operational space control solution is provided for rigid-body dynamical systems such as humanoid or legged robots. The solution includes an operational space controller that decomposes rigid body dynamics into task space dynamics and null space dynamics. Then, for systems that are fully actuated and have constraints, the controller provides control signals defining task space torques and null space torques for each actuator (e.g., a motor for a rotary joint between two rigid links). In some embodiments, a minimum torque vector is determined such that the controller is a minimum-torque operational space controller. For systems that are underactuated, task and null space dynamics are again considered, and underactuation is addressed by using null space forces to indirectly apply torque at passive degrees of freedom such as at active joints to create task-irrelevant motion that moves passive joints to facilitate task performance by the robot or rigid-body dynamical system.

12 Claims, 6 Drawing Sheets

(56) References Cited

OTHER PUBLICATIONS

Khatib, Oussama, "A Unified Approach for Motion and Force Control of Robot Manipulators: the Operational Space Formulation," IEEE Journal of Robotics and Automation, vol. RA-3, No. 1, Feb. 1987.

Sentis, Luis, "Synthesis and Control of Whole-Body Behaviors in Humanoid Systems," A Dissertation submitted to the Department of Electrical Engineering and the Committee on graduate Studies of Stanford University in Partial Fulfillment of the Requirements for the Degree of Doctor of Philosophy, 2007.

Sapid, Vincent De, et al., "Operational Space Control of Multibody Systems with Explicit Holonomic Constraints," Proceedings of the 2005 IEEE International Conference on Robotics and Automation, Barcelona, Spain, Apr. 2005.

\* cited by examiner

OPERATIONAL SPACE CONTROL OF RIGID-BODY DYNAMICAL SYSTEMS INCLUDING HUMANOID ROBOTS

BACKGROUND

1. Field of the Description

The present invention relates, in general, to improved techniques for controlling humanoid robots and other rigid-body dynamical systems, and, more particularly, to operational space control methods and operational space controllers that provide enhanced control over rigid-body dynamical systems such as robotic devices with constraints or constrained movements and such as underactuated robotic devices.

2. Relevant Background

Robots or robotic devices are widely used in manufacturing, assembly, packing and packaging, earth and space exploration, surgery, laboratory research, and entertainment. Some robots may include a series of rigid links or bodies linked together by joints, and some or all of the links may be moved or pivoted about the joints by actuators. Actuators are like the muscles of a robot as they respond to control signals, such as from a control system or controller, to convert energy into movement. The majority of robots use electric motors (DC or AC motors) as actuators to spin a wheel or gear while some actuators are provided in the form of linear actuators or other types of actuators. Robots that work in the real world typically provide some way to manipulate objects (e.g., pick up, move, or otherwise have an effect). For example, a hand (or foot) of a robot may be referred to as an end effector while the arm (or leg) is referred to as a manipulator, and these systems or devices of the robot may be made up of a number of rigid links or members interconnected by joints with movement at the joints controlled by actuators.

An ongoing challenge for those in the field of robotics is how to best or better control a robot or a rigid-body dynamical system to achieve a particular task (e.g., manipulate an item with an end effector). This problem may be greatly complicated when the robot is underactuated. An underactuated robotic system is a system with fewer independent control inputs than the degrees of freedom (DOFs). For example, a robotic arm may have 3 DOFs but the controller may only be able to provide two control inputs or control signals, e.g., the arm may have three joints but only two actuators such that one of the joints is a passive joint while the other two are active or actuated joints. As a result, the input control signals to the actuated joints have to compensate for the passive joint to achieve a desired movement.

Generally, the dynamics of a robot are considered in order to plan and execute fast, dexterous, and compliant motion. More specifically, the inertial and energy characteristics of the end effector or operational DOFs are important for the ultimate success of the task. With this in mind, researchers developed an operational space formulation that provides an equation of motion for a robot by expressing the dynamics in the robot's task space (i.e., the space in which the robot is commanded to operate such as the space of positions and orientations of an end effector). Such an operational space formulation can be used to derive end effector dynamics for rigid-body robot manipulators. The resulting control solutions compenate for (or linearize) operational space dynamics while decoupling tasks from redundant null space dynamics (with "null space" being robot movements not associated with the task space). In these operational space formulations, any additional forces applied within the null space remain dynamically consistent with the tasks.

While providing some improvement in control over robotic systems system as classical manipulators, operational space formulations have not yet been widely applied to a wider range of robotic systems. For example, it may be desirable to apply an operational space formulation as a control solution for modem humanoid robots that are typically complex, high DOF systems in which task dynamics need to be considered for manipulation, balance, locomotion, and so on. Adding to their complexity, humanoid systems may be both underactuated and constrained. The complete representation of their dynamics may have to consider the 6 DOF floating base link connected passively to an inertial reference frame. Additionally, contacts with the environment (e.g., feet, hands, and so on) input constraint forces into the system. Hence, an ongoing challenge for robotics designers is to more fully understand how underactuation and constraints interact with the dynamics of the tasks that a controller is designed to control.

Prior research has attempted to address operational space control within constrained environments. In one formulation, constraints applied at the end effector are considered as an additional task to be controlled, e.g., to realize a desired contact force. In another formulation, systems with more complex kinematic structures were examined including internal closed kinematic chains while others have taken a more general approach that included systems with holonomic constraints applying it to the operational space control of a parallel mechanism.

While this research represents progress toward improved control over robots including underactuated and constrained devices, there remains a need for further improved controllers for robots including rigid-body dynamical systems. Preferably, such controllers and control methods would utilize operational space control.

SUMMARY

The inventor recognized that a common theme among the works of these prior researchers is that the controllers are designed to remain dynamically consistent with the constraints. Specifically, the controllers contribute no acceleration at the constraint locations. However, because constraints by definition are able to apply necessary forces to maintain their own consistency, controllers do not need to address the dynamic consistency explicitly. As a consequence, many of the prior controllers based on operational space control can be significantly improved and simplified by using orthogonal projections in place of the oblique projections containing the inertia matrix. For example, other researchers were able to formulate both the direct and inverse dynamics of constrained systems using orthogonal projections derived from only kinematic parameters, which are easier to accurately determine than inertial parameters. Others, including the inventor, were able to apply orthogonal projections for the inverse dynamics control of legged robots, without requiring measurement or estimation of contact forces or oblique projections involving inertia matrices.

With this in mind, an objective of the operational space control methods described herein is to examine the role of orthogonal projections on constrained operational space dynamics. Significantly, working directly with the equations of projected inverse dynamics, the inventor was able to formulate operational space dynamics without consideration of constraint forces or constraint dynamic consistency. This leads to a much simplified and manageable solution that retains a similar form to the original unconstrained formulation.

Additionally, the description examines consequences of passive DOFs and underactuation in a rigid-body dynamical system such as a humanoid robot, robot arm, or the like. In contrast to prior researchers that used additional constraint forces to influence torque at passive joints, the inventor's operational space controllers (and control methods/solutions) use dynamically consistent null space forces to influence torque at passive joints. As will become clear, either constraint forces or null space motion may be applied with the controller to contribute forces indirectly to the passive DOFs without affecting task dynamics. The control approach described also works for unconstrained systems by using null space motion to compensate for passive degrees of freedom. The results achieved by the inventor are formulated in a unified manner, keeping the structure consistent regardless if the robot or rigid-body dynamical system is constrained or unconstrained and/or is fully actuated or underactuated. Examples of a controlled robot are provided with a 3 DOF simulated arm that is simple but useful for explaining the control techniques well and include examples containing both constraints and underactuation.

More particularly, a robot is provided with an operational space control solution (or controller implementing such a solution). The robot includes a dynamical system including a plurality of rigid links, joints pivotally connecting pairs of the rigid links (e.g., the robot has a number of degrees of freedom (DOFs)), and an actuator associated with each of the joints such that the robot is fully actuated. The robot further includes a constraint limiting motion of the dynamical system. Significantly, the robot also includes an operational space controller. This controller includes a constrained task space dynamics module and a constrained null space dynamics module each providing control signals to selectively drive the actuators to operate the robot to perform a task.

In some implementations, the control signals are generated by the constrained task space dynamics module to define a torque associated with the robot performing the task for each actuator/joint. In such cases, the control signals generated by the constrained null space dynamics module each defines a torque that is irrelevant to the robot performing the task. Then, the control signals generated by the constrained task space dynamics module may be considered to be decoupled from the control signals generated by the constrained null space dynamics module.

In practice, the control signals (or torques applied at each rotary or other joint or DOF) are selected to generate an end effector acceleration and also acceleration in the null space. However, the torques are selected to produce substantially no unnecessary constraint forces, whereby the operational space controller functions as a minimum torque controller for the robot. In some embodiments, the constraint reduces the number of DOFs by at least one (such as a 7 DOF robotic arm only having 6 DOF). Further, in some preferred embodiments, the control signals are generated based on orthogonal projections such that the operational space dynamics used in generating the control signals are derived free of explicit use of forces applied by the constraint or constraint consistency.

DETAILED DESCRIPTION

In prior robotic control efforts, an operational space formulation was applied to rigid-body manipulators to describe how to decouple task space and null space dynamics. Then, in these works, control equations were written that corresponded only to forces at the end effector or, alternatively, only to motion within the null space. In contrast, the inventor builds and improves upon this useful theory to apply it to modern humanoid robots and other legged systems (rigid-body dynamical systems that may be constrained and/or underactuated) for manipulation or performing other similar tasks. However, these rigid-body dynamical systems present additional challenges due to their underactuated floating bases and contact states that can dynamically change.

In more recent efforts to provide control solutions, controllers were derived for humanoid robots and other legged systems by implementing a task Jacobian projected into a space consistent with the supporting constraints and underactuation, e.g., the so-called support consistent reduced Jacobian. In contrast, though, the inventor takes a new approach to derive operational space controllers for constrained underactuated systems. First, the operational space dynamics were considered within projected inverse dynamics. Second, underactuation was resolved through the addition of dynamically consistent control torques. Significantly, this results in a simplified control solution compared with previous control efforts and solutions, and, importantly, it provided several new insights into the underlying problem of operational space control in constrained environments, including: (1) underactuated systems, such as humanoid robots, typically cannot completely decouple task and null space dynamics; (2) there may, however, exist an infinite number of control solutions to realize desired task space dynamics; and (3) these control solutions involve the addition of dynamically consistent null space motion or constraint forces (or a combination of both). In light of these findings by the inventor, the following description presents several possible control solutions, with varying optimization criteria, and highlights some of the practical consequences of use of the presented control solutions.

Figure 1:
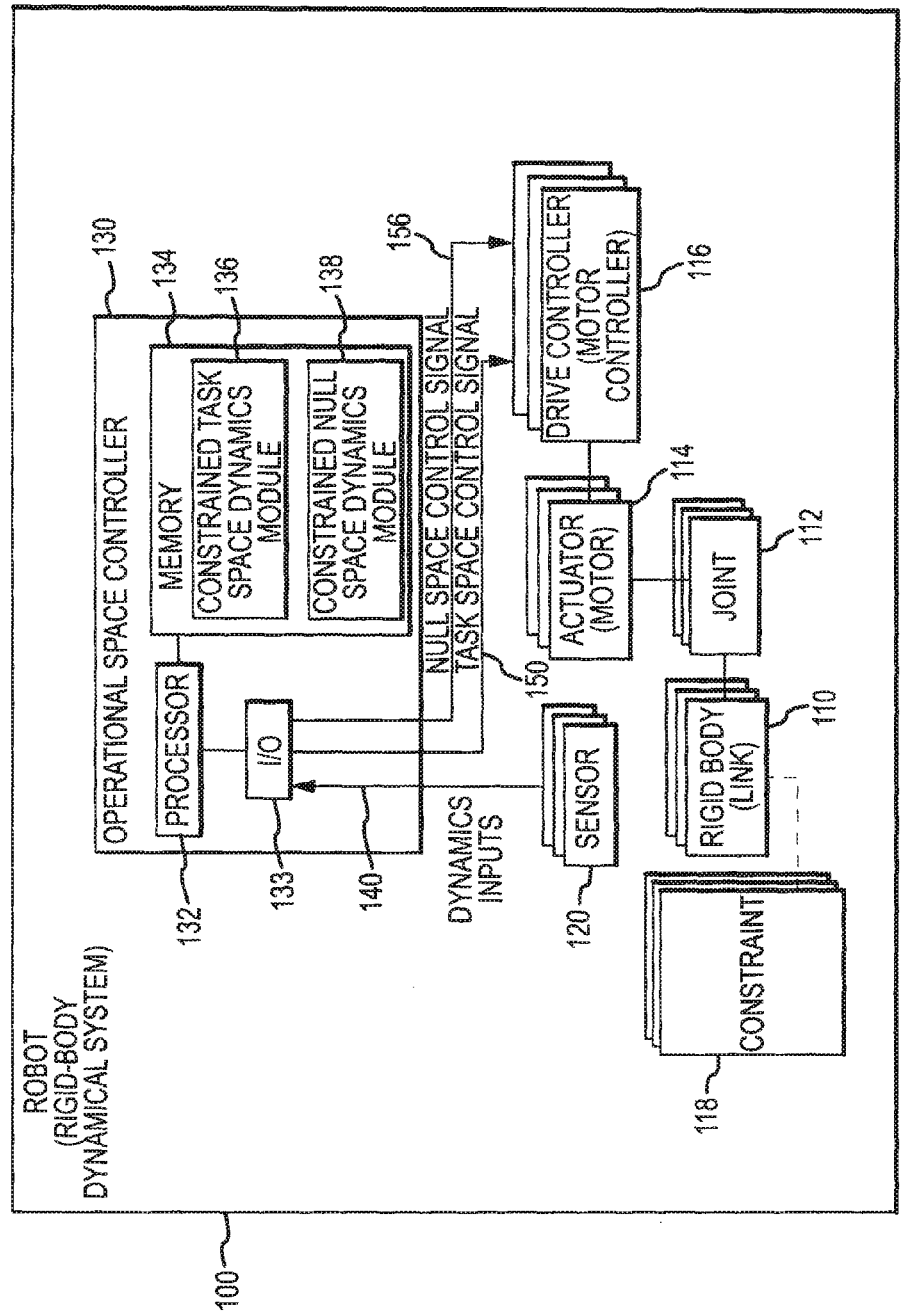
FIG. 1 illustrates a functional block diagram of an exemplary rigid-body dynamical system with an operational space controller of the present description used to provide control in a fully actuated and constrained implementation.

FIG. 1 illustrates an embodiment of a robot or, more generally, a rigid-body dynamical system 100 with an operational space controller 130 configured according to the present invention. The system 100 includes a plurality of rigid bodies or links 110 such as may be found in robotic arm, a walking humanoid robot, and the like, and the links 110 may be linked together with joints 112. The robot or system 100 is fully actuated and, to this end, an actuator (e.g., a driver such as an AC or DC motor, a hydraulic or pneumatic actuator that may be rotary or linear, or the like) 114 is provided for each joint 112 such that each joint is active (not passive). In other words, an actuator 114 may be provided for each degree of freedom (DOF) of the robot/system 100. Each of the actuators 114 is selectively operated by a drive controller 116, which may be in the faun of a motor controller or the like that causes the actuator to apply a particular torque on or at the joint 112.

The robot or system 100 is a constrained system as it includes (or operates upon or adjacent to) one or more constraints 118. For example, a floor may provide a constraint 118 for the floating base(s) of a walking humanoid robot 100 while a wall, rod, or similar constraint 118 may provide a horizontal movement constraint for a manipulator or link 110 (e.g., limit movement at link end to vertical movements and no further horizontal movement beyond a point). The robot or system 100 further may include sensors 120 that sense locations and/or movements of the rigid bodies 110 and/or joints 112 and provide these inputs/sensor readings 140 to the operational space controller 130 to allow location and movements of the rigid bodies 110 and joints 112 to be determined in real time and a near instantaneous manner to allow control signals 150, 156 to be generated in response.

Significantly, the robot or system 100 includes an operational space controller 130 that functions to provide a task space control signal (e.g., a torque value) 150 and also a null space control signal (e.g., a torque value) 156 to each of the drive controllers 116 to control each of the actuators 114. To this end, the controller 130 includes a processor (or CPU) 132 that manages operation of input/output (I/O) devices 133 that act to receive signals 140 from the sensors 120 and to output control signals 150, 156 to the drive controllers 116. The processor 132 also manages memory 134 so as to execute programs, software, or executable code in the form of a constrained task space dynamics module 136 and a constrained null space dynamics module 138. The constrained task space dynamics module 136 processes dynamics inputs and other motion equation parameters to generate torque or other output useful for generating the task space control signal 150 to operate actuators 114 (e.g., apply a torque at a joint 112 related to the task space). Concurrently the constrained null space dynamics module 138 processes dynamics inputs and other motion equation parameters to generate torque or other output useful for generating the null space control signal 154 to operate actuators 114 (e.g., apply a torque at a joint 112 related to the null space).

At this point, it may be useful to explain in more detail the inventor's operational space control solution and useful analysis of operation space dynamics. It may be assumed a robot (such as robot 100) has n degrees of freedom (DOFs), and the robot may be represented by the configuration vector $q \in R^n$. Additionally, the robot may have k linearly independent constraints such that locations in constraint undergo zero acceleration. This condition can be written as $\ddot{x}_C = J_C \ddot{q} + \dot{J}_C \dot{q} = 0$, where $J_C$ is the constraint Jacobian. Note, the constraints of this form can either be holonomic or nonholonomic. The robot may also be underactuated, in which case we have p active joints and l=n−p passive joints. The rigid-body inverse-dynamics equation may then be written as:

$$M(q)\ddot{q}+h(q,\dot{q})=B\tau+J_C^T(q)\lambda \qquad \text{Eq. (1)}$$

where $M(q) \in R^{n \times n}$ is the inertia matrix, $h(q,\dot{q}) \in R^n$ is the vector centripetal, Coriolis, and gravity forces, $\tau \in R^n$ is the vector of joint torques, $\lambda \in R^k$ is the vector of k linearly independent constraint forces, and $$B = \begin{bmatrix} I_p & O \\ O & O \end{bmatrix} \qquad \text{Eq. (2)}$$

is the projector into actuated joint space ($I_p$ is the p dimensional identity matrix). It can be assumed that the first p rows of Eq. (1) represent the actuated DOFs.

Analysis may continue with presenting an m DOF task (m≤n−k), e.g., control of an end effector, represented by the operational space configuration vector $x \in R^m$, and the task Jacobian J, defined by the relation $\dot{x}=J(q)\dot{q}$. For an unconstrained (k=0) and fully actuated (l=0) system such as a traditional robot manipulator, it is known that the dynamics in the operational space may be derived as:

$$\Lambda \ddot{x}+\Lambda(JM^{-1}h-\dot{J}\dot{q})=F \qquad \text{Eq. (3)}$$

where $\Lambda = (JM^{-1}J^T)^{-1}$ and F is an external force applied at the end effector. Further, the operational space control equation for redundant manipulators (m<n) has been formulated as:

$$\tau = J^T F + (I - J^T J^{T\#})\tau_0 \qquad \text{Eq. (4)}$$

where F is defined by Eq. (3) using a desired task acceleration $\ddot{x}_{des}$ in place of $\ddot{x}$, and $J^{T\#}$ is the following generalized inverse of $J^T$:

$$J^{T\#}=(JM^{-1}J^T)^{-1}JM^{-1} \qquad \text{Eq. (5)}$$

As noted by prior researchers, this generalized inverse is defined to be dynamically consistent with the task. It is the only generalized inverse that results in zero end effector acceleration for any $\tau_0$. This inverse also solves the equation $\dot{x}=J\dot{q}$ for the joint velocities that minimize the instantaneous kinetic energy of the system. By using Eq. (4), task space dynamics may be compensated for such that $\ddot{x}=\ddot{x}_{des}$, while also decoupling motion generated by $\tau_0$ from affecting task space dynamics.

Now, the inventor recognized that the operational space formulation can be extended to constrained systems using orthogonal projections. Constraints are defined as in Eq. (1) and can include systems with closed kinematic chains such as parallel mechanisms or humanoid/legged robots with two or more feet in contact with the environment. The following discussion first addresses the fully actuated system (as shown in system 100 of FIG. 1) and then extends the analysis to underactuated robots or rigid-body dynamical systems.

As noted by other researchers, Eq. (1) can be projected into the null space of the constraints, thereby eliminating the constraint forces from the dynamics equation. Then, the equation of projected inverse dynamics can be written as:

$$PM\ddot{q}+Ph=P\tau \qquad \text{Eq. (6)}$$

where P is an orthogonal projection operator such that $PJ^T_C=0$ and $P=P^2=P^T$. Also, P is readily computed from the constraint Jacobian: $P=I-J_C^+J_C$ (where + indicates the Moore-Penrose pseudoinverse). Note that P depends only on kinematic parameters and, unlike other approaches that attempt to maintain dynamic consistency with constraints, it does not require the inertia matrix.

Next, it is desirable to invert PM to solve for q. However, because P is generally rank deficient, this term will not be invertible. But, because the robot or system is constrained, the following additional equations are available:

$$(I-P)\dot{q}=0 \quad \text{Eq. (7)}$$

$$(I-P)\ddot{q}=C\dot{q} \quad \text{Eq. (8)}$$

where C is $(d/(dt))P$, e.g., $C=-J^+_C J_C$. Now, recognizing that Eq. (8) is orthogonal to Eq. (6), the two equations can be added together to provide:

$$M_c\ddot{q}+Ph-C\dot{q}=P\tau \quad \text{Eq. (9)}$$

Defining $M_c=PM+I-P$. Note, the choice of Mc for a given q is not unique but is always invertible (provided M is invertible).

Next, Eq. (9) may be multiplied by $JM_c^{-1}$ and $J\ddot{q}$ can be replaced by $\ddot{x}-\dot{J}\dot{q}$ to obtain:

$$\ddot{x}-\dot{J}\dot{q}+JM_c^{-1}(Ph-C\dot{q})=JM_c^{-1}P\tau \quad \text{Eq. (10)}$$

A force at the end effector F is mapped into joint torques via $\tau=J^T F$, and, therefore, the constrained operational space dynamics is derived as:

$$\Lambda_c\ddot{x}+\Lambda_c(JM_c^{-1}Ph-(\dot{J}+JM_c^{-1}C)\dot{q})=F \quad \text{Eq. (11)}$$

where $\Lambda_c=(JM_c^{-1}PJ^T)^{-1}$. Although $M_c$ is not unique, $M_c^{-1}P$ will be unique (for a given q) and, therefore, Eq. (11) is also unique.

Now, the operational space control equation for constrained (or fully actuated) systems (such as system/robot 100 of FIG. 1) also takes the form of Eq. (4). However, the inventor recognized that F can be defined by Eq. (11) (again, replacing $\ddot{x}$ with a desired task acceleration $\ddot{x}_{des}$) and the following generalized inverse of $J^T$ may be used:

$$J^{T\#}=(JM_c^{-1}PJ^T)^{-1}JM_c^{-1}P \quad \text{Eq. (12)}$$

Then, it is straightforward to verify that this generalized inverse is dynamically consistent. For example, Eq. (12) can be applied to Eq. (4) and then subsequently to Eq. (11) to see that $\ddot{x}=0$ for any $\tau_0$ (e.g., any torque). Also, because $M_c^{-1}P$ is unique, the dynamically consistent inverse is also unique. Additionally, this generalized inverse minimizes the instantaneous kinetic energy in the constrained space. For notational simplicity, we can define $N=I-J^T J^{T\#}$ and then write the control equation (for a joint space controller) as:

$$\tau=J^T F+N\tau_o \quad \text{Eq. (13)}$$

Figure 2:
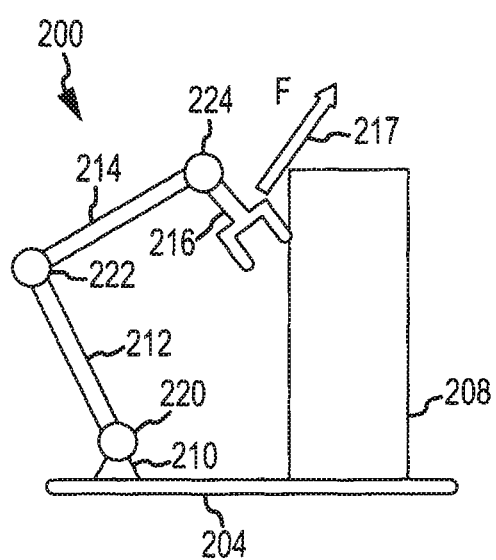
FIG. 2 illustrates a side view of an exemplary rigid-body dynamical system or robot with constraints that may be controlled by an operational space controller of the present description.

FIG. 2 illustrates a rigid-body dynamical system or robot 200 in the form of a 3 DOF planar arm with rotary joints. In this example, the robot 200 includes a platform or support 204 upon which a constraint or wall 208 is provided to constrain movement of the robot to vertical movement (limiting horizontal movement of an end effector or link 216). A first or base link 210 is affixed to the platform 204 and linked/connected to a second link or rigid body 212 via a rotary joint 220. The second link 212 is, in turn, linked via rotary joint 222 to a third link or rigid body 214, which is connected or linked via rotary joint 224 to fourth link or end effector 216. Although not shown, each actuator 220, 222, 224 is an active joint and is associated with an actuator/driver for applying a particular torque. The robot 200 may be controlled to position the fourth link or end effector 216 and/or to apply a force F as shown with arrow 217. The motion is constrained by the wall 208 such that the 3 DOF is reduced 2 DOF for the robot 200.

Figure 3:
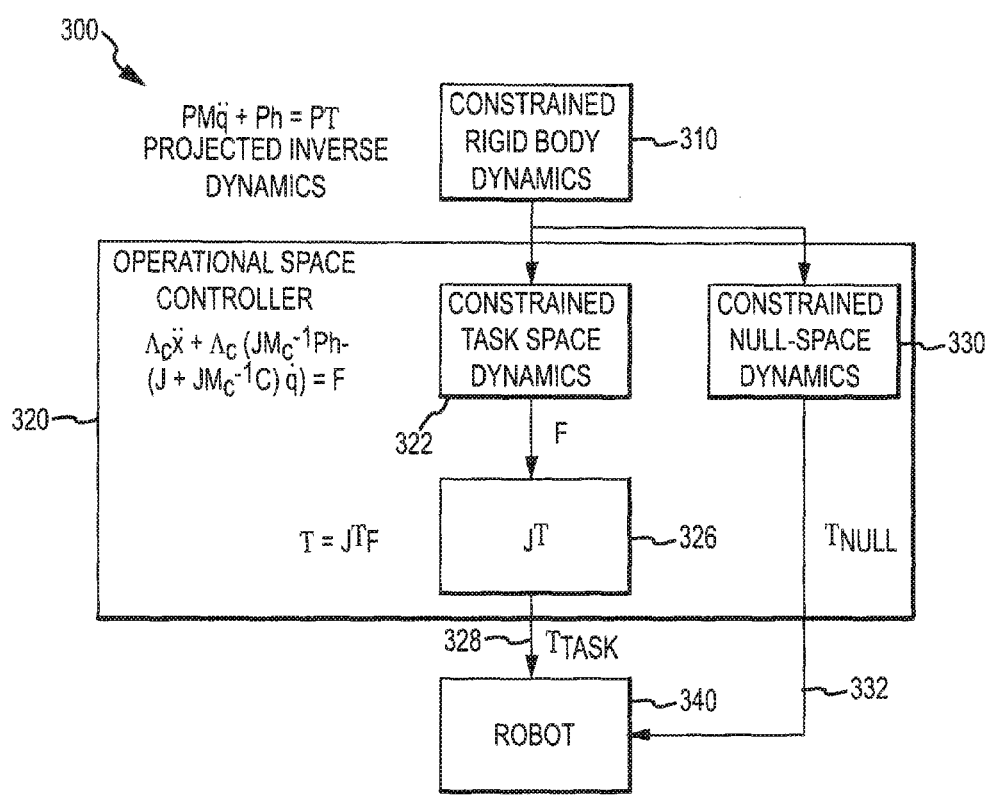
FIG. 3 illustrates in block form an operational space control solution as may be used to control a fully-actuated and constrained robot such as that shown in FIG. 2.

FIG. 3 illustrates with a functional block diagram a control solution (method of providing operational space control) 300 that is particularly suited for systems or robots such as robot 200 that are fully actuated and also constrained. As shown, the control solution may include decomposing or decoupling the constrained rigid body dynamics 310 (which may be defined by the equation shown or Eq. (6)). Such decomposition is shown to be performed within an operational space controller 320 at 322 with a determination of the constrained task space dynamics and at 330 with a determination of the constrained null space dynamics There are numerous ways to map end effector force (shown as F with arrow 217 in FIG. 2) into joint torque, and this mapping may be performed at 326 (e.g., by a constrained task space dynamics module 136 as shown in FIG. 1). The output of the operational space controller 320 is a joint torque associated with the task 328 and a null space joint torque 332, which are provided to each of the actuators for joints of a robot 340 such as rotary joints 220, 222, and 224 of robot 200.

In many cases, it is desirable to reduce the magnitude of the control torques (such as torques 328, 332 used to control robot 340 in FIG. 3). Eq. (13) is a joint space controller that emulates a force F as if it were externally applied to the end effector (e.g., to end effector 216 of robot 200). This controller (or control solution) replicates both the joint motion and constraint forces that would result from the external force. However, constraint forces generate no robot motion and, ultimately, no acceleration of the end effector. Thus, a control equation can be considered that produces the joint acceleration desired without adding extraneous constraint force. The control equation can be rewritten as a sum of three components as:

$$\tau=PJ^T F+PN\tau_0+(I-P)\tau_C \quad \text{Eq. (14)}$$

where $PJ^T F$ generates end effector acceleration, $PN\tau_0$ generates acceleration only in the null space (with zero end effector acceleration), and $(I-P)\tau_C$ produces only constraint forces and no joint space motion. If one is not concerned about the constraint forces generated, the norm of the input torque can be reduced by setting $\tau_C=0$.

This controller will produce motion identical to that achieved with a controller operating according to Eq. (13) but with different constraint forces and a smaller total control input (since P is an orthogonal projection, it can be verified that $\|P\tau\|\leq\|\tau\|$, $\forall \tau$). In other words, there are potentially infinite ways to map end effector force into joint torque, and the inventor recognized a technique of taking advantage of this redundancy to optimize criteria such as magnitude of applied torque. For example, one can take advantage that a constraint is providing a force or pushing back on an end effector (or other link/portion of the robot) to solve the control problem in a more efficient way (e.g., can use less torque due to the presence of the constraint). Briefly, a smallest torque vector is computed by the operational space controller (or its software modules) to determine a minimum torque needed at each joint, which is reflected in the control signals or output torque values 328, 332 provided to control the actuators in task and null space, respectively such that the operational space controller can be considered a minimum torque controller.

It may be desirable also to provide an enhanced control solution to underactuated robotic assemblies such as rigid-body dynamical systems in which fewer actuators or drive motors are provided than the DOFs of the robotic assembly (e.g., a 7 DOF robotic arm device may have one or more joints that are passive such as by providing 6 actuators for 7 rotary joints or the like). The inventor has recognized that an operational space controller may be provided to control such underactuated rigid-body dynamical systems again by decoupling null space dynamics from task space dynamics.

Figure 4:
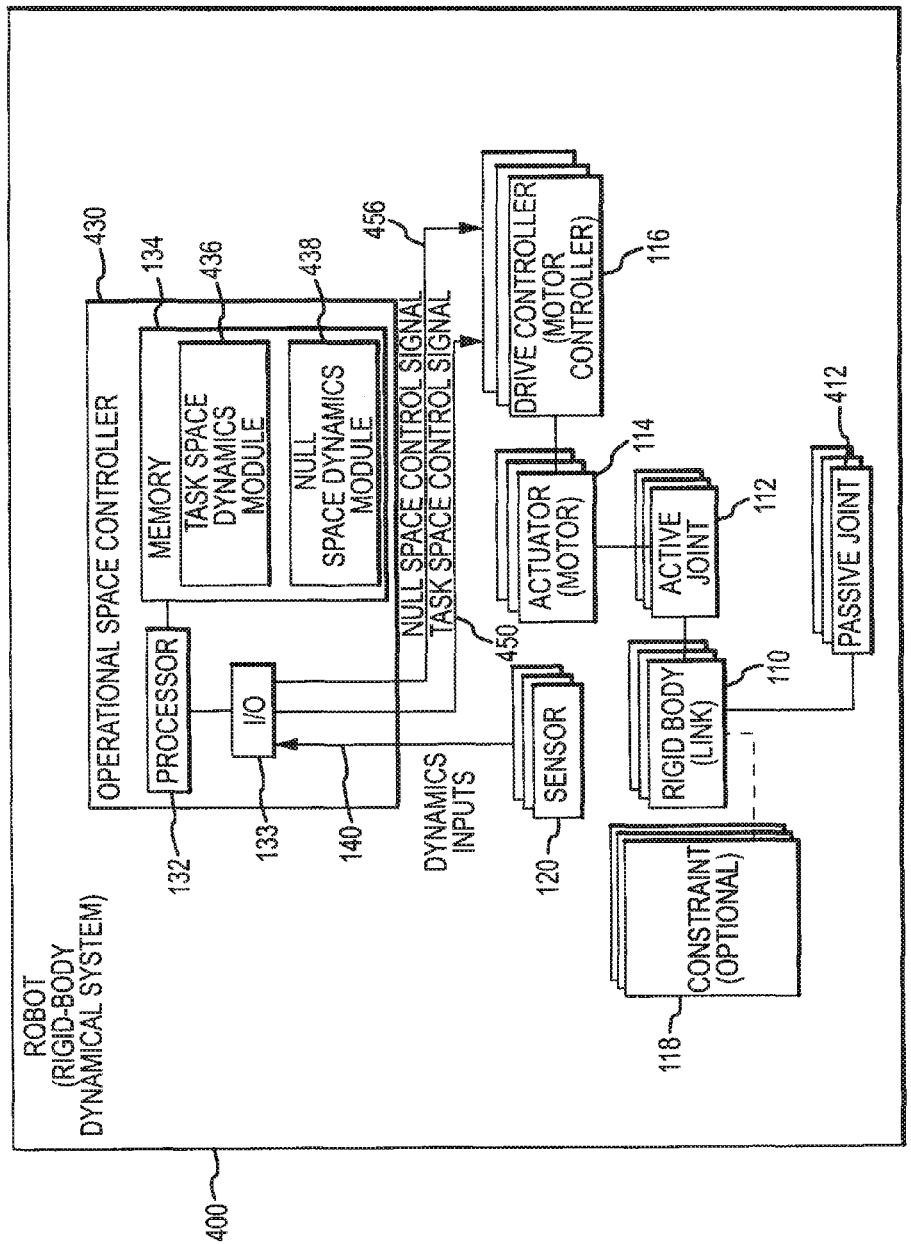
FIG. 4 illustrates a functional block diagram of another exemplary rigid-body dynamical system with an operational space controller of the present description used to provide control in an underactuated and constrained or unconstrained implementation.

Specifically, FIG. 4 illustrates a robot or rigid-body dynamical system 400 implementing an operational space controller 430. The robot 400 is similar to robot 100 of FIG. 1 except that the robot 400 may or may not be constrained via one or more constraints 118. Further, as shown, the robot 400 includes active joints 112 that are driven by actuators (e.g., AC or DC motors or the like) 114, but it also includes one or more passive joints 412 that are not driven (e.g., a rotary or other connector between two rigid links to allow the links to pivot relative to each other but that is not driven as are joints 112). Hence, the robot is underactuated with or without constraints 118.

The robot's operational space controller 430 includes a task space dynamics module 436 that outputs a task space control signal (defining joint torque magnitude in the task space) 450 that is provided to a drive controller 116 of each actuator 114 of each active joint 112. The operational space controller 430 also includes a null space dynamics module 438 that generates a null space control signal 456 defining joint torque magnitude in the null or task irrelevant space to the drive controllers 116 of actuators 114 of active joints 112. The torques (and control signals 450, 456) differ from those discussed above for robot 100 as discussed below to account for underactuation of the robot 400.

When a rigid-body dynamical system or robot (such as robot 400 of FIG. 4) contains passive DOF (l>0), it may no longer be possible to generate desired end effector forces using a direct mapping to joint torques via a Jacobian transpose. The torques that can be generated are limited by the following constraint, which always must be satisfied:

$$\tau = B\tau \qquad \text{Eq. (15)}$$

Although in general $J^TF \neq BJ^TF$, the inventor recognized that Eq. (15) may still be satisfied by adding a null space component. When doing so, the additional null space torque can still be guaranteed to not affect the task space dynamics. Note, however, because the task space dynamics are not compensated for without the addition of null space torques, it is no longer possible to decouple task and null space dynamics. Applying Eq. (13) to Eq. (15) results in:

$$J^TF + N\tau_0 = BJ^TF + BN_{96\,0} \qquad \text{Eq. (16)}$$

and it is possible to solve for $\tau_0$:

$$(I-B)J^TF = -(I-B)N\tau_0 \qquad \text{Eq. (17)}$$

$$\tau_0 = -[(I-B)N]^+(I-B)J^TF \qquad \text{Eq. (18)}$$

again using the Moore-Penrose pseudoinverse. Provided Eq. (17) has at least one valid solution for $\tau_0$, Eq. (18) can be used in Eq. (13), and the control equation can be written as:

$$\tau = (I - N[(I-B)N]^+(I-B))J^TF \qquad \text{Eq. (19)}$$

Also, because (I−B) is an orthogonal projection, the equation simplifies to:

$$\tau = (I - N[(I-B)N]^+)J^TF \qquad \text{Eq. (20)}$$

If the system has sufficient redundancy, there may be an infinite number of possible control solutions. However, by using the Moore-Penrose pseudoinverse in Eq. (18), the computation is for the minimum possible $|\tau_0|$. Thus, Eq. (20) represents the operational space control solution with the minimum possible null space effect.

Other possible solutions are considered in the following discussions. But, note, Eq. (20) is a general equation that can be applied to both unconstrained and constrained systems (see, the system 400 of FIG. 4, for example) by using either Eqs. (3) and (5) or Eqs. (11) and (12), respectively. In the unconstrained case, the controller generates dynamically consistent null space motion in order to compensate for lost torque at the passive joints. However, in the constrained case, the controller uses a combination of both motion and constraint forces to generate torque at the passive joints.

Figure 5:
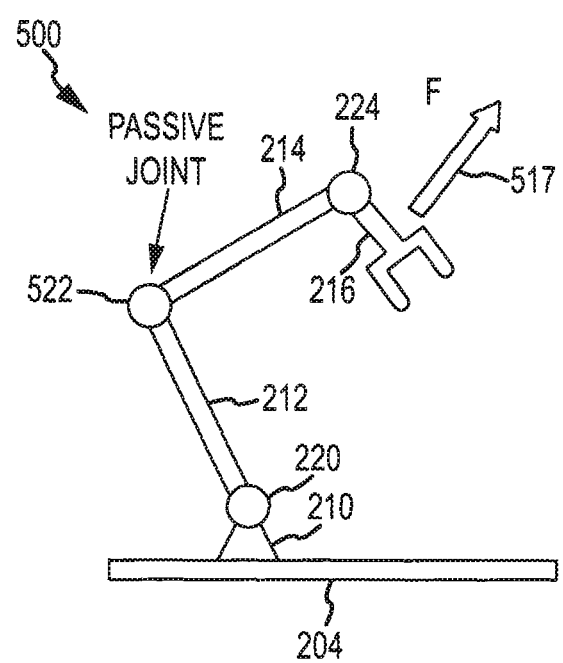
FIG. 5 illustrates, similarly to FIG. 2, a side view of an exemplary rigid-body dynamical system or robot that is underactuated and unconstrained and that may be controlled by an operational space controller described herein.

FIG. 5 illustrates, similarly to FIG. 2, an exemplary rigid-body dynamical system 500 in the form of a robotic arm. The system 500 may include similar components to that of system 200 and these components are labeled with similar element numbers. These may include the mounting platform 204, the first or base link 210, the second rigid link 212 pivotally attached to the base link 210 via an active or actuated rotary joint 220, the third rigid link or body 214, and the fourth rigid link or end effector 216 pivotally attached to the third link 214 via active or actuated joint 224. The end effector 216 may be controlled to move to a particular location and apply a particular force F shown with arrow 517, and the end effector 216 may be unconstrained as shown or constrained in some embodiments (not shown in FIG. 5 but see FIG. 4 and system 400). The system 500 is underactuated because it includes a passive joint 522 pivotally connecting links 212 and 214 such that the system 500 includes one less actuator or drive device compared with the number DOFs.

Figure 6:
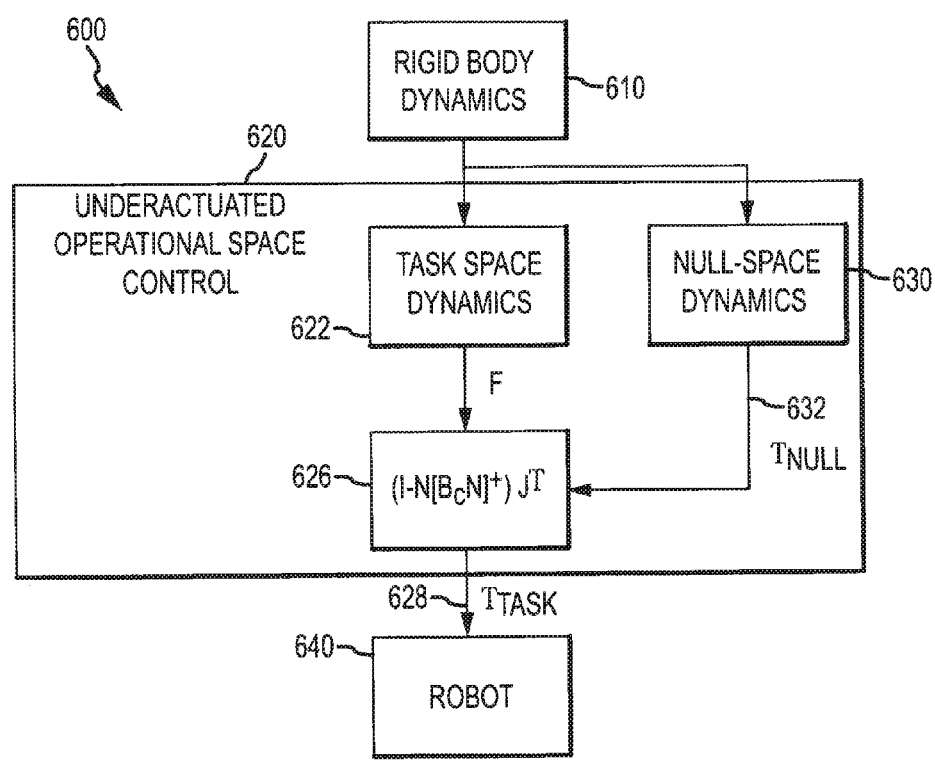
FIG. 6 illustrates in block form an operational space control solution as may be used to control an underactuated and unconstrained robot such as that shown in FIG. 5 or an underactuated and constrained robot.

FIG. 6 illustrates a control solution or method 600 in functional block form, and this method 600 may be used for controlling underactuated systems such as robot 500 of FIG. 5 that are constrained or unconstrained. As shown, the robot being controlled is a rigid-body dynamical system such as a typical robotic arm or humanoid robot and the rigid body dynamics 610 are decomposed into task space dynamics 622 and null space dynamics 630 (such as may be determined by modules 436 and 438, respectively, of controller 430 shown in FIG. 4). In contrast to the control solution 300 for fully-actuated systems, passive joints do not allow for direct mapping of end effector force into joint torques. The inventor understood that the solution 600 has to account for underactuation by more carefully or differently applying torques to the active joints to control movement of the passive joints and, hence, to affect or achieve a desired overall movement of a robot or rigid-body dynamical system.

Significantly, as shown with arrow 632 and functional box 626, the solution 600 uses null space forces to indirectly apply torque at passive DOFs (such as at joint 522 of the robot 500 of FIG. 5), e.g., torque at passive joints may be generated indirectly through movement of active joints. The null space forces 632 may be in the form of additional constraint forces (if available) or may be task irrelevant motion. The control signals 628 (and, in some cases, 632) are applied to the active DOFs, such as rotary joints 220, 224 of robot 500 of FIG. 5, of robot 640 to obtain the desired movement, e.g., force F at an end effector or manipulation or the like.

Returning to the analysis of control solutions for systems with underactuation, it may be important or useful to consider multiple tasks for a robot. If more than one task is to be performed, underactuation can be addressed using dynamically consistent torque as discussed above, but the torque should be dynamically consistent with all tasks. As an example, consider two tasks with Task 1 having a higher priority than Task 2. The augmented Jacobian can be defined for all tasks as $J_a^T = [J_1^T J_2^T]$, and the null space projector that is dynamically consistent with all tasks as: $N_a = I - J_a^T J_a^{T\#}$. Then, the operational space control equation can be written as:

$$\tau = J_1^T F_1 + N_1 J_2^T F_2 + N_a \tau_0 \qquad \text{Eq. (21)}$$

and, solving for $\tau_0$ as done previously, the control solution can be written as:

$$\tau = (I - N_a[(I-B)N_a]^+)(J_1^T F_1 + N_1 J_2^T F_2) \qquad \text{Eq. (22)}$$

With regard to providing a joint acceleration consistent controller, the multi-task solution above assumes there is sufficient redundancy remaining after the assignment of all tasks. If all DOFs of the robot are accounted for in $J_a$ (e.g., Rank($J_a$)=n), then it is impossible to add any motion that will not conflict with at least one task. However, if the robot has constraints, constraint forces can still be added to resolve underactuation, without inducing any additional joint space motion. Then, the following equation can be used:

$$\tau = J^T F + (I-P)\tau_C \qquad \text{Eq. (23)}$$

where $N\tau_0$ of Eq. (13) has been replaced with $(I-P)\tau_C$, the torques that induce only constraint forces and zero joint acceleration. The replacement is legitimate or acceptable since (I-P) projects into a subspace of N, i.e., (I-P)=N(I-P). Then, Eq. (15) can be satisfied with the following control equation, which is derived similarly to Eq. (19) but by replacing N with (I-P):

$$\tau = (I-(I-P)[(I-B)(I-P)]^+(I-B))J^T F \qquad \text{Eq. (24)}$$

As both (I-P) and (I-B) are orthogonal projections, the equation simplifies to:

$$\tau = (I-[(I-B)(I-P)]^+)J^T F \qquad \text{Eq. (25)}$$

and even further reduces to:

$$\tau = [PB]^+ J^T F \qquad \text{Eq. (26)}$$

The above solution is significant for a number of reasons. First, it will produce identical joint acceleration as if the system were fully actuated (but constrained). The null space component, which is utilized to resolve underactuation, produces only constraint force and no additional motion. Therefore, this controller provides a control solution that resolves underactuation with a minimal amount of kinetic energy. Secondly, the projector $[PB]^+$ is identical to the projector of constrained underactuation inverse dynamics controllers. For example, to achieve a desired joint space acceleration $\ddot{q}_{des}$, provided $\ddot{q}_{des}$ is constraint consistent, the following controller can be used independent of constraint forces:

$$\tau = [PB]^+(M\ddot{q}_{des}+h) \qquad \text{Eq. (27)}$$

Thirdly, Eq. (26) presents a reduced form over prior control solutions for task space motion control of humanoid and legged robots. For example, the inertia matrix only appears in F and is not used in the projector or Jacobian, and others have shown in detail a proof of equivalence between orthogonal and oblique projector operators in the context of joint acceleration or inverse dynamics control.

With regard to a motion only controller, the previous controller defined in part by Eq. (26) only uses constraint forces to resolve underactuation. For comparison, one could consider a controller that only uses null space motion. The controller would then be written as:

$$\tau = (I-PN[(I-B)PN]^+)J^T F \qquad \text{Eq. (28)}$$

where N of Eq. (20) has been replaced with PN. Again, this is possible since PN=NPN. As this controller only uses null space motion to resolve underactuation, it attempts not to change the constraint forces generated by task dynamics.

In order to test the validity of the above described and defined operational space controllers, it may be useful to provide some examples using a relatively simple robot or system, which still makes sense for use in adding constraints and/or underactuation. Specifically, a simulated 3 DOF planar arm with rotary joints may be used an exemplary robot/system (see robot 200 and 500 of FIGS. 2 and 5). Each link of the robot simulator may be chosen to have the same length in the test/example and have the same inertial parameters. It can also be assumed that there is zero gravity and one may include a small amount of viscous friction at the joints. The system may also be defined as having a 1 DOF bilateral constraint that fixes the x position of the end effector and a 1 DOF task (e.g., they position of the end effector). To consider underactuation, an actuator at a joint may be turned off (such as shown for joint 522 in the system 500 of FIG. 5). The task may be to regulate a new end effector position $x_{target}$, and the desired task acceleration may be set as:

$$\ddot{x}_{des} = K_p(x_{target}-x) - K_D\dot{x} \qquad \text{Eq. (29)}$$

The following five constrained operational space controllers were tested by the inventor and labeled as shown: (1) FA—the fully actuated operational space controller of Eq. (13), with $\tau_0=0$; (2) FAr—the fully actuated controller with reduced torque as shown in Eq. (14), with $\tau_0=0$ and $\tau_C=0$; (3) UAN—the underactuated controller that minimizes the null space contribution as shown with Eq. (20); (4) UACF—the underactuated controller that uses only constraint forces (and therefore minimizes instantaneous kinetic energy) as shown with Eq. (26); and (5) UAPN—the underactuated controller that uses only null space motion as shown with Eq. (28). The same control parameters (gains) were used for each of these five test cases.

In the tests, the resulting motion and constraint forces for each of these controllers for the robot/system were simulated for 2 seconds and plotted. Further, the task regulation performance for the five controllers was determined and plotted. As expected by the inventor, the fully actuated controllers FA and FAr produced identical motion but very different constraint forces. The sum of the norm torque was summed over the 2 seconds, and the results showed that the FAr controller reduced this sum by 30.0 percent. As a consequence, contact forces were increased and even flipped in sign.

In the underactuated case, all three controllers achieved the task in spite of the passive joint. Even with zero torque at one of the joints (see robot 500 in FIG. 5), the UACF controller produced identical motion to the fully actuated controllers; however, this was achieved with a noticeable increase in constraint force profile. The UAPN Controller, which uses purely null space motion to resolve underactuation, significantly increased the kinetic energy of the system/robot. However, it maintained the most similar constraint force profile compared to controller FA of the three underactuated controllers. By minimizing the null space impact, the UAN controller seems to reach or provide a compromise solution between the other two underactuated controllers, e.g., a slight increase in kinetic energy in trade for a relatively lower contact force profile.

One useful property of some of the equations described herein is that they retain the same form whether the system is constrained or unconstrained. Thus, one may be able to use them to control operational space dynamics for underactuated systems without constraints. To test this concept, the inventor removed the constraint from the 3 DOF test arm (see FIG. 2) and, instead, added a secondary task to control the end effector position in the x direction. A hierarchical multi-task controller may be used such that the secondary task does not interfere with the primary task. This technique was used to validate the following two controllers: (1) FAuc—a fully actuated, multi-task controller using Eq. (21) with $\tau=0$ and (2) UANuc—an underactuated multi-task controller using Eq. (22), with a third joint being a passive joint (as shown in FIG. 5 for robot 500).

The resulting simulation was plotted to show primary and secondary task performance and to also show the instantaneous kinetic energy. These plotted results confirmed that the controllers could achieve both tasks, and the underactuated robot uses more energy since it adds null space motion to compensate for torque at the passive joints. Note, this controller is similar to a partial feedback linearization; however, rather than linearizing the dynamics of active or passive joints, the solutions described herein are linearizing the operational space dynamics.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. It should be noted that task space is typically robot or system movement that is relevant to performing a task while the null space is robot or system movement that is irrelevant to the task (and task space). For example, a robot may have 7 DOF and be assigned a 6 DOF task, and this would result in 6 DOFs being in the task space and controlled with task space torque signals to perform the task and 1 DOF being in the null space and controlled with null space torque or control signals. In practice, each active or actuated joint in a rigid-body dynamical system will receive, from the operational space controllers described herein, a control signal (a torque value), even those that are in the null space when the system is operated to perform a task.

The above description has presented a new methodology for deriving operational space controllers for constrained and underactuated systems. In doing so, the inventor introduced two key ideas: (1) for constrained systems, one can take advantage of orthogonal projections and significantly simplify the formulation by deriving operational space dynamics without explicitly considering constraint forces or constraint consistency and (2) for underactuated systems, one can compensate for passive DOFs by applying additional null space forces. As a consequence, it can be seen that task and null space dynamics are no longer decoupled (for underactuated systems).

Previous works have attempted to address constraints and underactuation within the context of operational space control. These works relied on logic that the solution must remain dynamically consistent with the constraints. End effector dynamics were then derived using the support consistent reduced Jacobian, which maps dynamics from a reduced constraint space into task space motion. The resulting controller does not affect dynamics of points in contact, as if these points were additional operational space tasks to achieve. However, constraints, by definition, are able to supply the necessary forces to maintain their own consistency and, thus, do not need to be accounted for in the controller.

While the derivation presented in these prior works is ultimately correct, it remains overly complicated with inertia matrices appearing unnecessarily in the projection operators. As an example, if one fully expanded their operational space control equation, one would see the inertia matrix appear nine times. In contrast, Eq. (26) only includes the inertia matrix three times and only in the F term. As inertia matrices are often difficult to determine accurately for real robots, including these matrices increases the risk that errors will be introduced into the controller.

Another insight provided by the above description and inventor's progress in control solutions is that null space forces can be and preferably are used to compensate for underactuation. These forces come in the form of constraints or null space motion and, of course, do not affect task space dynamics.

The inventors have shown that available redundancy in the null space can allow various optimization criteria to be defined, such as the minimization of kinetic energy or null space effects. It may also be possible to exploit this redundancy to aid in task achievement. For example, certain configurations of a robot may result in singularities for some controllers but not for others. If a constraint force vector becomes directly aligned with a passive joint, then it cannot contribute any torque to it. In this case, a control solution that relies on constraint forces may become singular, however, by introducing some null space motion, one may be able to remove this singularity.

I claim:

1. A robot, comprising:
    a dynamical system including:
        a plurality of rigid links;
        joints pivotally connecting pairs of the rigid links, wherein the robot has a number of degrees of freedom (DOFs); and
        an actuator associated with each of the joints, whereby the robot is fully actuated;
    a constraint positioned relative to the dynamical system to apply force upon the dynamical system thereby limiting vertical or horizontal motion of the dynamical system beyond a predefined position; and
    an operational space controller comprising a constrained task space dynamics module and a constrained null space dynamics module both concurrently providing control signals to drive the actuators to operate the robot to perform a task,
    wherein the control signals generated by the constrained task space dynamics module each defines a torque associated with the robot performing the task and
    wherein the control signals generated by the constrained null space dynamics module each defines a torque that is irrelevant to the robot performing the task.

2. The robot of claim 1, wherein the control signals generated by the constrained task space dynamics module are decoupled from the control signals generated by the constrained null space dynamics module.

3. The robot of claim 1, wherein the control signals are selected to generate an end effector acceleration and acceleration in the null space while producing substantially no unnecessary constraint forces, whereby the operational space controller is a minimum torque controller.

4. The robot of claim 1, wherein the constraint reduces the number of DOFs by at least one.

5. The robot of claim 4, wherein the control signals are generated based on orthogonal projections such that operational space dynamics used in generating the control signals are derived free of explicit use of forces applied by the constraint.

6. A robotic apparatus with operational space control, comprising:
    a rigid-body dynamical system with a first number of DOF and a second number of actuators driving movement of the rigid-body dynamical system, wherein the second number is less than the first number such that the robotic apparatus is underactuated; and
    an operational space controller controlling the actuators based on a combination of task space torques and null space torques,
    wherein the null space torques define movements at the actuators to apply torque at a passive subset of the DOFs.

7. The robotic apparatus of claim 6, wherein the null space torques further comprise constraint forces.

8. The robotic apparatus of claim 6, wherein the movements associated with the null space torques include task irrelevant motion for the robotic apparatus.

9. The robotic apparatus of claim 6, wherein the rigid-body dynamical system comprises a plurality of rigid links interconnected by rotary joints providing the DOFs for the robotic apparatus.

10. The robotic apparatus of claim 9, wherein at least one of the rotary joints is passive.

11. The robotic apparatus of claim 6, wherein the operational space controller comprises a processor executing code to provide a task space dynamics module and a null space dynamics module each processing dynamics of the rigid-body dynamical system to produce the task space torques and the null space torques, respectively.

12. The robotic apparatus of claim 11, wherein the null space torques generate forces at passive ones of the DOF to provide movement of the robotic apparatus to perform a task.

* * * * *